(12) United States Patent
Simpson et al.

(10) Patent No.: US 11,313,473 B2
(45) Date of Patent: Apr. 26, 2022

(54) BUTTERFLY VALVE WITH VIBRATION RESISTANT MOUNT

(71) Applicant: Hamilton Sundstrand Corporation, Charlotte, NC (US)

(72) Inventors: Scott W. Simpson, Feeding Hills, MA (US); Calvin R. Parent, Enfield, CT (US); David J. Zawilinski, W. Granby, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/012,666

(22) Filed: Sep. 4, 2020

(65) Prior Publication Data

US 2022/0074500 A1 Mar. 10, 2022

(51) Int. Cl.
*F16K 1/22* (2006.01)
*F16K 47/00* (2006.01)

(52) U.S. Cl.
CPC .............. *F16K 1/224* (2013.01); *F16K 47/00* (2013.01)

(58) Field of Classification Search
CPC ......... F16K 1/224; F16K 47/00; F16C 19/527
See application file for complete search history.

(56) References Cited

U.S. PATENT DOCUMENTS

| | | | |
|---|---|---|---|
| 3,753,386 A | 8/1973 | Scott, Jr. | |
| 3,797,324 A | 3/1974 | Sheesley et al. | |
| 4,507,005 A | 3/1985 | Siewert et al. | |
| 5,906,029 A * | 5/1999 | Fox | E05D 5/16 16/386 |
| 10,088,056 B2 | 10/2018 | McAuliffe et al. | |
| 10,215,389 B2 | 2/2019 | Duong et al. | |
| 2010/0108932 A1 * | 5/2010 | Bauer | F16C 33/58 251/305 |
| 2012/0144939 A1 * | 6/2012 | Kullin | F16C 25/083 74/25 |
| 2015/0183455 A1 * | 7/2015 | Wang | F16C 25/083 180/444 |

FOREIGN PATENT DOCUMENTS

| | | |
|---|---|---|
| EP | 3048350 B1 | 2/2020 |
| GB | 1542417 | 3/1979 |

OTHER PUBLICATIONS

European Search Report for EP Application No. 21183784.4 dated Jan. 18, 2022.

* cited by examiner

*Primary Examiner* — Reinaldo Sanchez-Medina
*Assistant Examiner* — Nicole Gardner
(74) *Attorney, Agent, or Firm* — Carlson, Gaskey & Olds, P.C.

(57) ABSTRACT

A valve member is mounted on a shaft to pivot within a fluid passage. A control selectively moves a piston in a linear direction to control a position of the valve member in the fluid passage. The piston causes a roller pin to move as the piston moves linearly. The roller pin is mounted in crank collars of a crank shaft such that movement of the roller pin causes the crank collars to rotate crank shaft rotating position, and the valve shaft. The roller pin is mounted within the crank collars by bearings. The bearings each have an outer race associated with a crank collar, an inner race associated with the roller pin, and bearing members separate the inner and outer race. There is a spring bias resisting movement of the inner races relative to said roller pin. An anti-ice system is also disclosed.

18 Claims, 4 Drawing Sheets

BUTTERFLY VALVE WITH VIBRATION RESISTANT MOUNT

BACKGROUND

This application relates to a vibration resistant mount for roller pin bearings on a butterfly valve.

Butterfly valves are known, and utilized in any number of applications. In general, a butterfly valve includes a valve member which pivots within a fluid passage to control the amount of opening of the fluid passage.

An actuator piston drives a roller pin, and the roller pin drives a crank shaft to in turn rotate a valve shaft to cause the valve member to pivot within the fluid passage, and control the amount of fluid passing through the passage.

The roller pin is mounted on bearings such that crank collars of the crank shaft may rotate about the roller pin.

One application for a butterfly valve is in an anti-ice system for a gas turbine engine. In such system, relatively hot air is selectively directed to areas that might experience icing to melt the ice.

SUMMARY

A butterfly valve includes a valve member mounted on a shaft to pivot within a fluid passage. An actuator includes a piston having opposed piston heads associated with fluid chambers. A control selectively moves the piston in a linear direction to control a position of the valve member in the fluid passage. The piston causes a roller pin to move as the piston moves linearly. The roller pin is mounted in crank collars of a crank shaft such that movement of the roller pin causes the crank collars to rotate a crank shaft rotating position, and the valve shaft. The roller pin is mounted within the crank collars by bearings. The bearings each have an outer race associated with one of the crank collars, an inner race associated with the roller pin, and bearing members separate the inner and outer race. There is a spring bias resisting movement of the inner races relative to said roller pin.

A gas turbine engine anti-ice system is also disclosed.

These and other features of this application may be best understood from the following drawings and specification, the following is a brief description.

DETAILED DESCRIPTION

Figure 1:
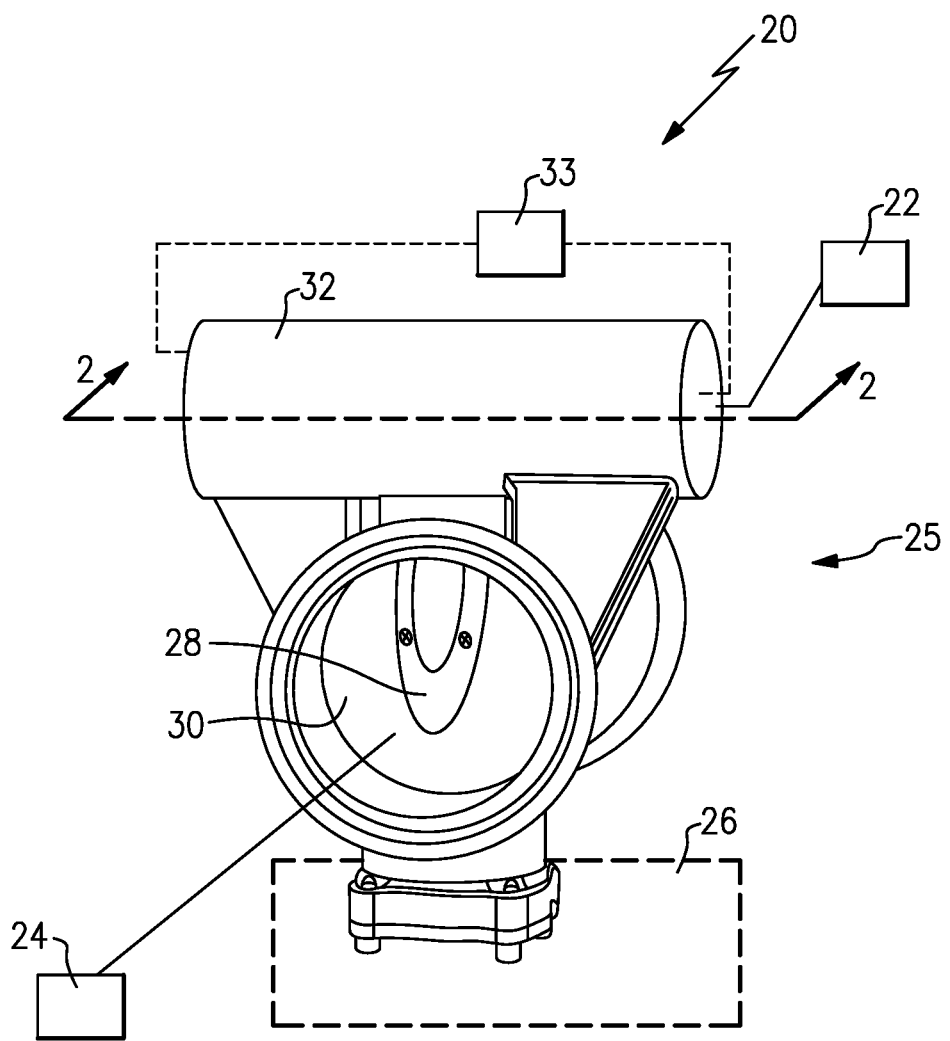
FIG. 1 shows an anti-ice system schematically.

An anti-ice system 20 controls the flow of hot air from a source 22, such as a gas turbine engine compressor, to a destination 24. The destination 24 may be an area on an associated aircraft that needs deicing. A butterfly valve 25 is shown controlling the amount of airflow from the source 22 to the destination 24. Butterfly valve 25 may be mounted directly on a gas turbine engine 26, shown schematically. With such a mount, the butterfly valve 25 will experience vibration during operation.

The butterfly valve 25 includes a valve member 28 that pivots within a fluid passage 30 to control the amount of airflow. An actuator 32 controls the position of the valve member 28. A control 33 supplies fluid to opposed chambers (see FIG. 2) to move a piston, and control the position of members.

Figure 2:
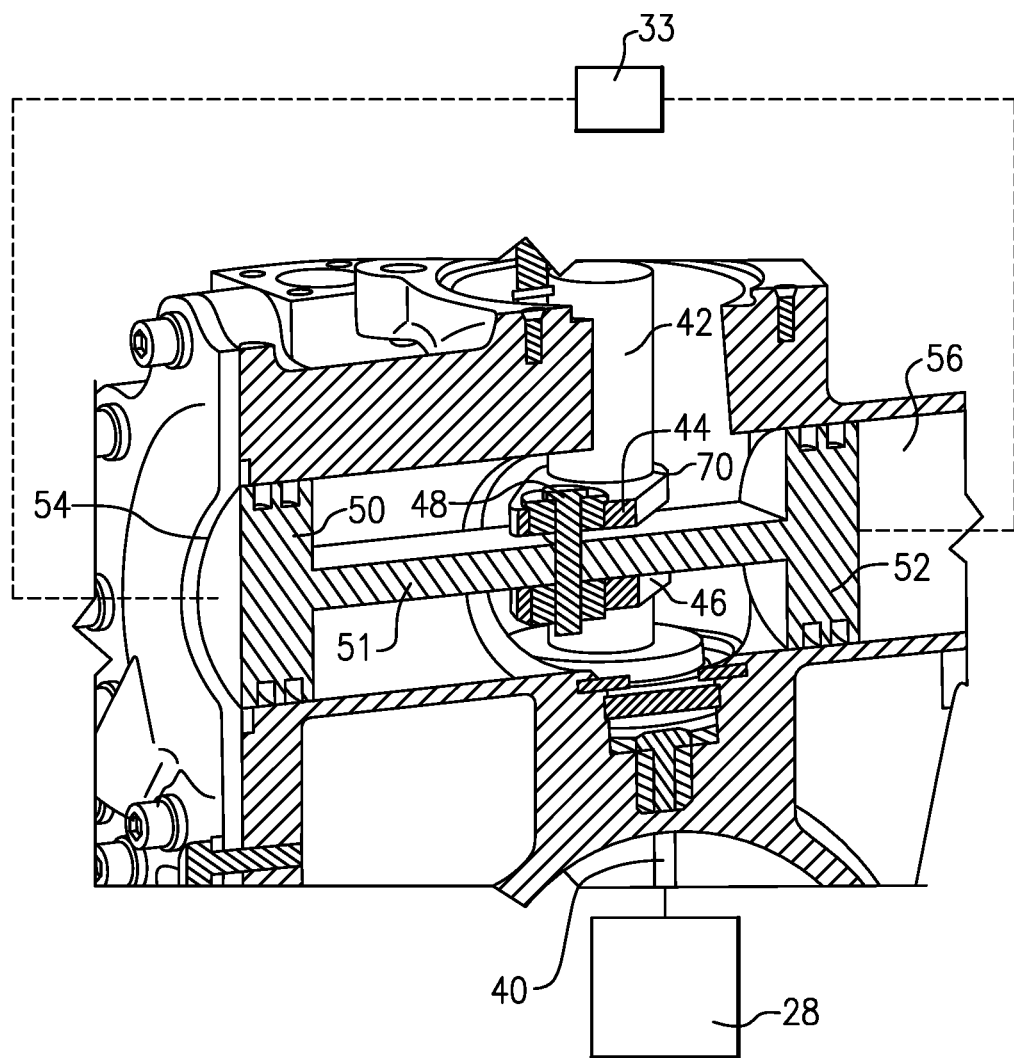
FIG. 2 is a cross sectional view through a butterfly valve actuator as shown along line 2-2 of FIG. 1.

FIG. 2 is a cross-sectional view along line 2-2 as shown in FIG. 1. As shown, the actuator 32 includes a piston having piston heads 50 and 52 associated with fluid chambers 54 and 56. A piston connecting portion 51 connects piston heads 50 and 52.

Fluid is selectively delivered by control 33 into the chambers 54 and 56 to move the piston to a desired position to in turn control the position of the valve member 28. A valve shaft 42 is driven to rotate to cause a valve shaft extension 40 to move the valve member 28. A roller pin 48 drives crank collars 44 and 46 of a crank shaft 70 to cause the valve shaft 42 to rotate.

Figure 3:
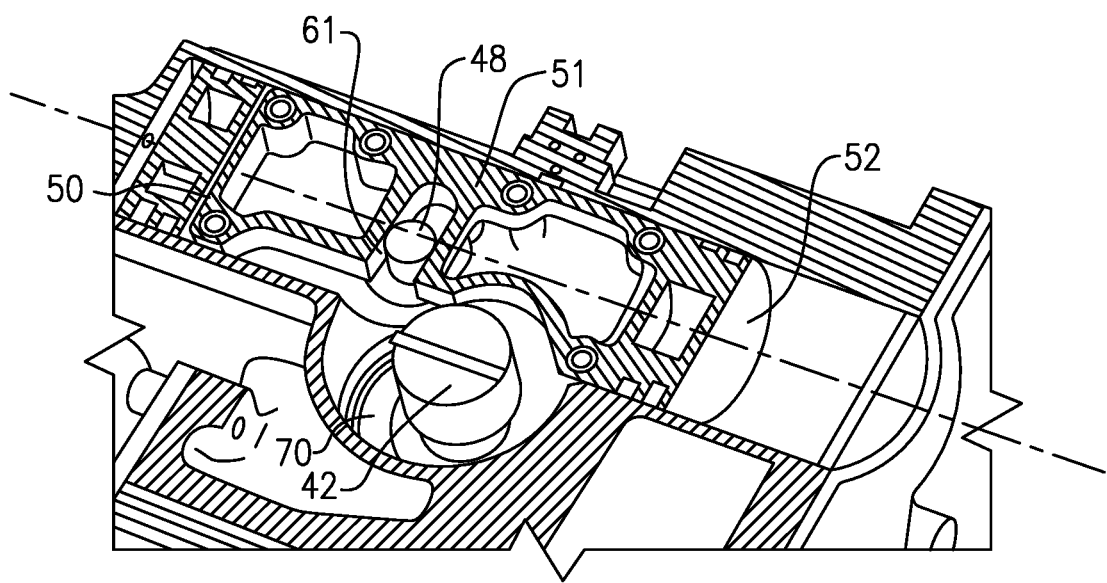
FIG. 3 is a top cutaway view of the actuator of FIG. 2.

FIG. 3 shows detail with a piston connecting member 51 and roller pin 48. As shown, roller pin 48 moves within a slot 61 to cause the crank shaft 70 to rotate and rotate the valve shaft 42. As understood, as the piston 50/51/52 moves linearly, the roller pin 48 will slide within the slot 61, and cause the crank shaft 70 to rotate.

Figure 4:
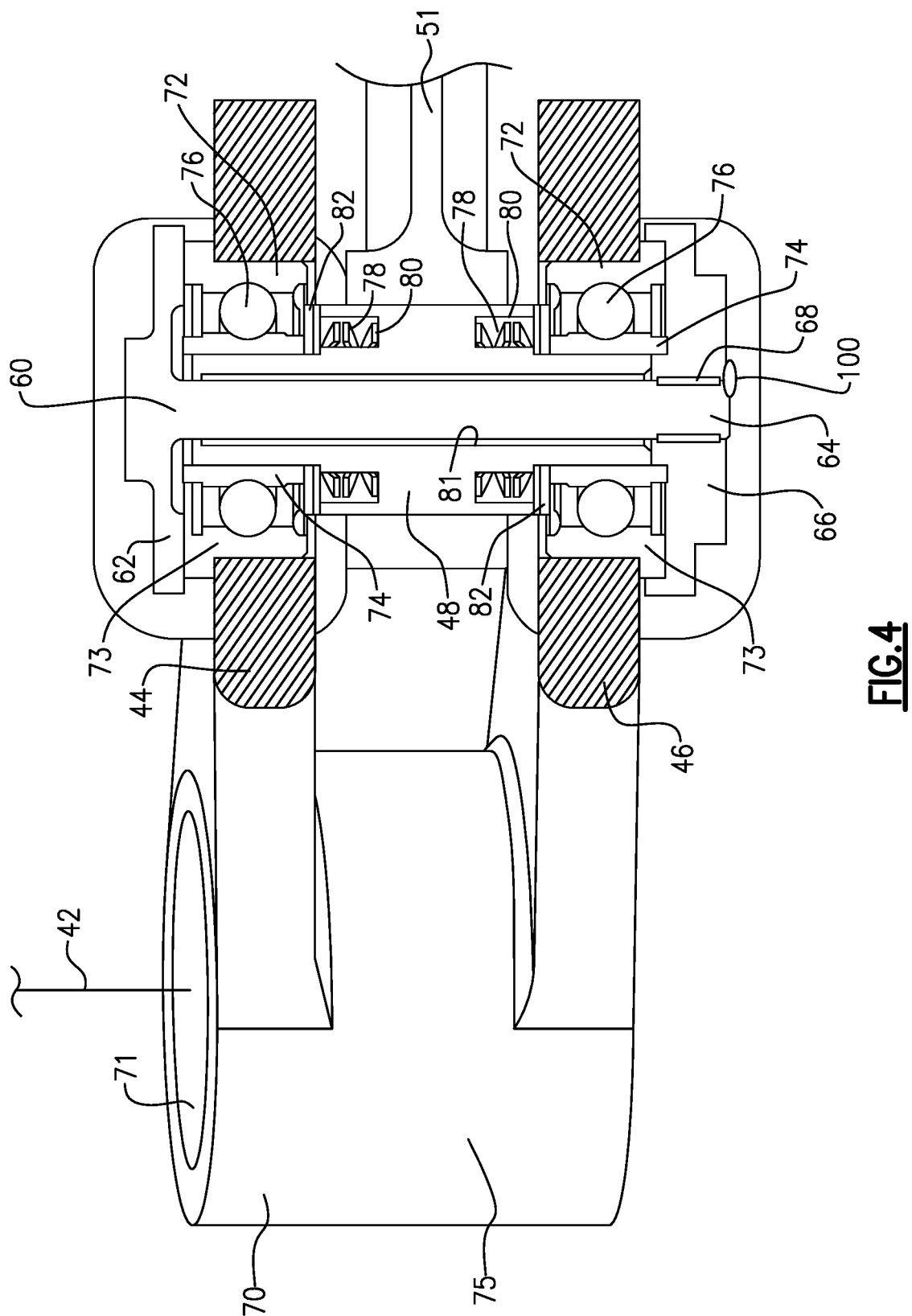
FIG. 4 shows a detail of a crankshaft and roller pin arrangement.

FIG. 4 shows details of the crankshaft 70 having a bore 71 in a rotating portion 75 receiving the valve shaft 42. Crank collars 44 and 46 extend from the rotating portion 75 of the crankshaft 70. The crank collars 44 and 46 surround the roller pin 48. As shown, the roller pin 48 receives a retention bolt 60 having a head 62 and a retention nut 66 at a remote end 64 of the bolt 60. Bolt 60 extends through a bore 81 in roller pin 48. Torque between the bolt and nut provides the primary method of securing the bolt to the nut. Secondary retention is obtained via a locking helical coil insert 68. Finally, a tack weld 100 secures the bolt end 64 to the retention nut 66 as a tertiary securing method to further enhance the joint in the high vibration environment. Bearings 73 mount the roller pin 48 within each crank collar 44 and 46. The bearings 73 include an outer race 72 moving with the crank collar 44 and 46 and an inner race 74 moving with the roller pins 48. Ball bearings 76 sit between the races 72 and 74.

Channels 78 in the roller pin 48 are associated with each bearing 73. The channels receive a wave spring 80, and the wave springs 80 apply a bias outwardly through a shim 82 to resist movement of the inner races 74. As is clear from FIG. 4, both channels 78 are positioned between the two opposed inner races 74. The term "outwardly" as utilized in this paragraph means that each spring biases its shim 82 and inner race 74 in opposed directions. Now, when vibration is experienced the wave springs 80 and shims 82 resist movement of the inner races 74.

The wave springs 80 may be formed of Inconel®. Inconel® is a registered trademark of Special Metals Corporation for a family of austenitic nickel-chromium steel superalloys. However, other appropriate materials (such as 1707 steel) which can withstand the temperatures expected to be experienced at the locations may be utilized. In general, a nickel alloy steel may be appropriate. Similarly, the shims may be formed of an appropriate steel.

The size of the shims 82 is selected in combination with the spring force of the wave springs 80 to get to a desired preload. Thus, preferably, there would be some limited movement of the inner races 74, but that amount of movement is controlled, and limited by the wave springs 80. The shims 82 assist in limiting this movement to a desired amount of movement.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A butterfly valve comprising:
a valve member mounted on a shaft to pivot within a fluid passage;
an actuator including a piston having opposed piston heads associated with fluid chambers, and a control to move the piston in a linear direction to control a position of said valve member in said fluid passage, said piston causing a roller pin to move as said piston moves linearly, said roller pin mounted in crank collars of a crank shaft such that movement of said roller pin causes said crank shaft to rotate said valve shaft;
said roller pin being mounted within said crank collars by bearings, said bearings each having an outer race associated with one of said crank collars, an inner race associated with said roller pin, and bearing members separating said inner and outer race, there being a spring bias resisting movement of said inner races relative to said roller pin, said spring bias being provided by a pair of springs, with one of said springs being associated with each of said inner races, and said spring bias being in an outward direction such that said each of said springs biases its inner race in an opposed direction relative to the other; and
wherein said roller pin having channels associated with each of two axial ends, there being two of said channels, and both of said channels being positioned between said bearings and receiving one of said spring members to apply said spring bias to each said inner race.

2. The butterfly valve as set forth in claim 1, wherein said spring members are wave springs.

3. The butterfly valve as set forth in claim 2, wherein a shim is positioned between each said wave spring and said inner race.

4. The butterfly valve as set forth in claim 1, wherein a shim is positioned between said spring member and each said inner race.

5. The butterfly valve as set forth in claim 4, wherein said roller pin moves within a slot in a connecting portion of said piston connecting said opposed piston heads.

6. The butterfly valve as set forth in claim 5, wherein said roller pin has an internal bore and a bearing retention bolt extends through said inner bore and receives a nut at a remote end to secure said roller pin within said crank collars.

7. The butterfly valve as set forth in claim 6, wherein said nut is welded to said remote end of said bolt.

8. The butterfly valve as set forth in claim 1, wherein said roller pin moves within a slot in a connecting portion of said piston connecting said opposed piston heads, wherein said roller pin has an internal bore and a bearing retention bolt extends through said inner bore and receives a nut at a remote end to secure said roller pin within said crank collars, wherein said nut is welded to said remote end of said bolt.

9. A gas turbine engine anti-ice system comprising:
a source of hot air to provide deicing;
a destination to receive the hot air for deicing a location on an aircraft associated with a gas turbine engine; and
a butterfly valve controlling flow from said source to said destination, the butterfly valve including:
a valve member mounted on a shaft to pivot within a fluid passage;
an actuator including a piston having opposed piston heads associated with fluid chambers, and a control to move the piston in a linear direction to control a position of said valve member in said fluid passage, said piston causing a roller pin to move as said piston moves linearly, said roller pin mounted in crank collars of a crank shaft such that movement of said roller pin causes said crank shaft to rotate said valve shaft;
said roller pin being mounted within said crank collars by bearings, said bearings each having an outer race associated with one of said crank collars, an inner race associated with said roller pin, and bearing members separating said inner and outer races, there being a spring bias resisting movement of said inner races relative to said roller pin, said spring bias being provided by a pair of springs, with one of said springs being associated with each of said inner races, and said spring bias being in an outward direction such that said each of said springs biases its inner race in an opposed direction relative to the other; and
wherein said roller pin having cavities associated with each of two axial ends, there being two of said channels, and both of said channels being positioned between said bearings and receiving one of said spring members to apply said spring bias to each said inner race.

10. The gas turbine engine anti-ice system as set forth in claim 9, wherein said spring members are wave springs.

11. The gas turbine engine anti-ice system as set forth in claim 10, wherein a shim is positioned between said wave spring and said inner race.

12. The gas turbine engine anti-ice system as set forth in claim 9, wherein a shim is positioned between said spring member and said inner race.

13. The gas turbine engine anti-ice system as set forth in claim 12, wherein said roller pin moves within a slot in a connecting portion of said piston connecting said opposed piston heads of said piston.

14. The gas turbine engine anti-ice system as set forth in claim 13, wherein said roller pin has an internal bore and a bearing retention bolt extends through said inner bore and receives a nut at a remote end to secure said roller pin within said crank collars.

15. The gas turbine engine anti-ice system as set forth in claim 14, wherein said nut is welded to said remote end of said bolt.

16. The gas turbine engine anti-ice system as set forth in claim 9, wherein said roller pin moves within a slot in a connecting portion of said piston connecting said opposed piston heads of said piston, wherein said roller pin has an internal bore and a bearing retention bolt extends through said inner bore and receives a nut at a remote end to secure said roller pin within said crank collars.

17. The gas turbine engine anti-ice system as set forth in claim 16, wherein said nut is welded to said remote end of said bolt.

18. The gas turbine engine anti-ice system as set forth in claim 9, wherein said butterfly valve is mounted on a gas turbine engine.

* * * * *